Patented Aug. 9, 1932

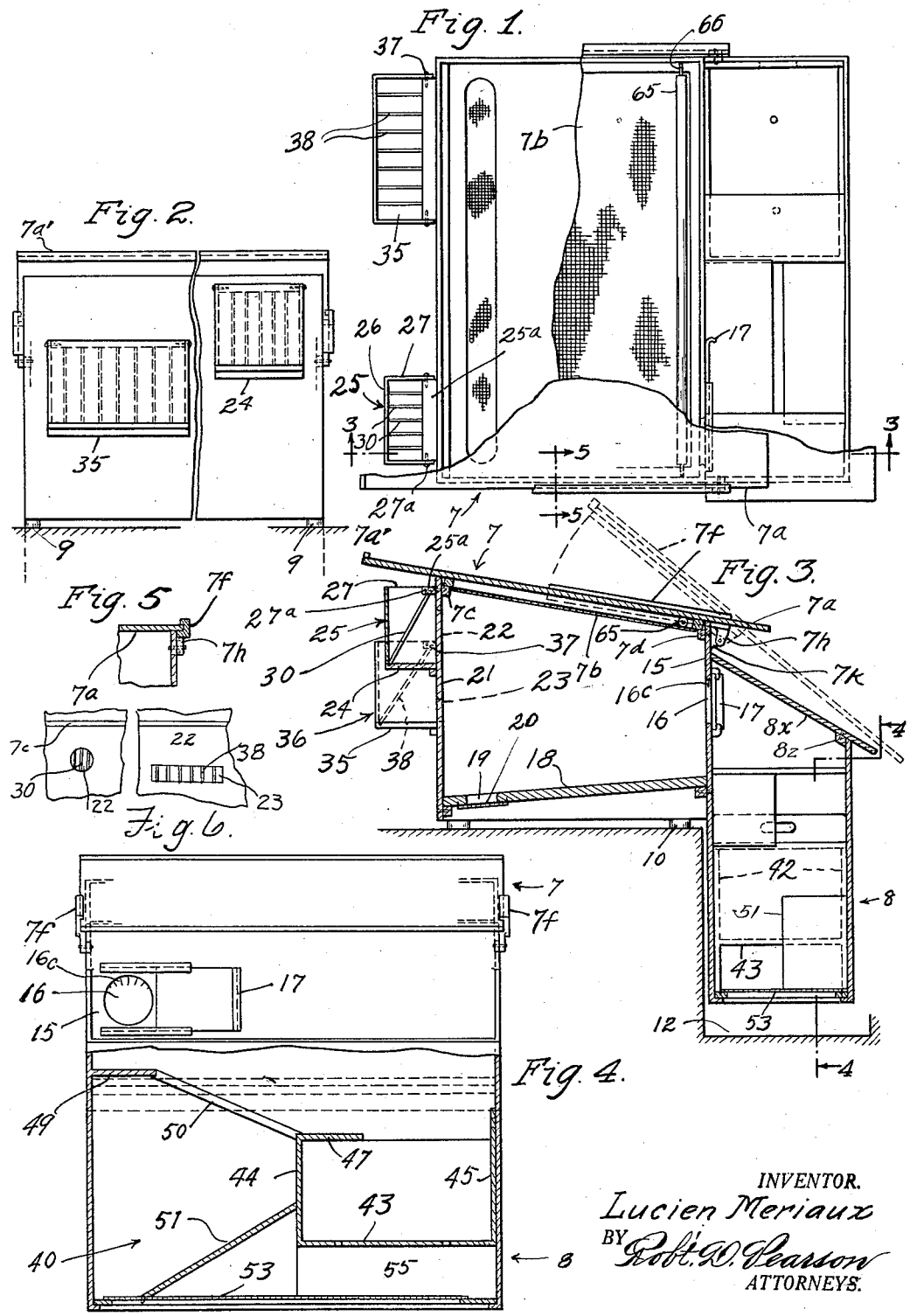

1,870,957

UNITED STATES PATENT OFFICE

LUCIEN MERIAUX, OF CULVER CITY, CALIFORNIA

ANIMAL HUTCH

Application filed March 4, 1931. Serial No. 519,942.

This invention relates to an improved rabbit hutch construction, which though primarily intended for rabbits will also be found serviceable as a habitation for other animals particularly those of the fur-bearing class.

An object of the invention is to provide a hutch which will protect, from stormy weather, in a more efficient manner the animals confined therein and which will also be furnished with improved means for keeping the same cool during hot, sunshiny weather.

Another object of the invention is to provide a hutch so constructed that a portion thereof may conveniently be embedded in the earth thus providing a specially cooled compartment which will simulate the burrow which the animal would make and in which it would bring forth its young in the natural wild state.

Still another object of the invention is to provide improved means for supplying the feed and cleaning out the feed receptacles so that the feed is kept in a sanitary condition and is economically supplied to the animals.

Among other objects of the invention is the provision of the improved means for ventilating the hutch in order to supply the animals with plenty of fresh air without exposing them to chilling drafts.

Yet another object of the invention is to cut down cost of construction and prolong the life of the movable parts of the device by providing closure elements of an improved character thereby avoiding the use of the doors ordinarly used in the housing devices hitherto in use for animals.

Other objects, advantages and features of invention may hereinafter appear.

Referring to the accompanying drawing which illustrates what is at present deemed to be a preferred embodiment of the invention, Fig. 1 is a plan view of the complete construction.

Fig. 2 is an end elevation looking from the left to the right of Figs. 1 and 3, the central portion of the hutch being broken away to contract the view.

Fig. 3 is a vertical section on line 3—3 of Fig. 1.

Fig. 4 is a vertical section on line 4—4 of Fig. 3.

Fig. 5 is a sectional detail of the slidable roof member.

Fig. 6 is a fragmental inner face view of a portion of the front wall of the structure illustrating the feed openings.

Referring in detail to the drawing, the hutch comprises two sections, a main upper section 7 and a lower section 8, the latter section being, if desired, to a greater or less extent embedded in the earth. As illustrated in the drawing, the upper section 7 is maintained slightly elevated above the surface of the ground by means of four small supports or foot members 9, 9 and 10, 10; while the rear section 8 is, throughout its lower portion, contained within an excavation 12 provided therefor. It will be understood, however, that by providing posts to take the place of the supports 9 and 10, the rear or lower section 8 may rest upon the surface of the ground, while the upper section is maintained at a considerable distance thereabove.

Any suitable door opening or passage may be provided to afford communication between the sections 7 and 8. In the drawing the back wall 15 of the section 7 is shown provided with a hole 16 which is provided with a sliding door 17.

The front section 7 is provided with a floor 18 which desirably slopes forwardly as shown, and which is provided near its front edge with an elongated opening 19 to permit the droppings to escape, a screen guard or apron 20 being placed below this opening to prevent the animals from passing out therethrough.

The section 7 is provided with an upright front wall 21 which is shown provided with a round feed opening 22 and an elongated feed opening 23. In front of the round opening 22 is shown a feed-supporting platform 24 and a food container 25 which is adapted to contain the feed supported by the platform 24. Said container 25 is preferably formed of sheet metal having the back portion 26 and the end portion 27. Each of the end portions 27 is pivotally supported at its upper inner corner at 27a thus allowing the container to be swung upwardly and outwardly when it is desired to clean off the platform 24. An inclined grating or series of feed bars 30 is provided within the container 25, the upper ends of these bars extending through a header 25a which is attached to the wall 21. By this construction a manger is provided having an open top into which feed of a grassy nature may be placed and which the rabbits or other animals within the hutch may reach between the bars 30.

In like manner the elongated feed opening 23 has a platform 35 thereunder, a food container 36 pivotally mounted at 37 above said platform, said container being provided with the series of inclined bars 38, all similar in construction to the feed manger already described.

Underneath the removable cover member 7a, the compartment 7 is provided with a removable screen cover member 7b which is supported at its front end or side by a cleat 7c and at its rear side by a cleat 7d. The screen cover member 7b is placed on the lower side of the frame thereof thus providing a broad shallow container upon which feed, preferably of a grassy nature, may be placed, the meshes of the screen being sufficiently large to permit the animals to have access to the grassy material supported upon the screen. When it is not necessary to use the upper cover member 7a to protect the animals from hot sunshine or inclement weather, the same may be removed and air thereby more freely admitted to the interior of the upper compartment 7.

Describing more in detail the construction of the lower compartment 8, this part of the device is provided with a box-like structure which is of a removable character and which has the side walls 42, a bottom 43, a short end wall 44 at one end, and at the other end an end wall 45 which extends up above the top of the sides 42 and which preferably is constructed with some kind of a finger hold to render the whole box structure more easily removable. At the end of this box arrangement which is opposite to the wall 45, a platform 47 is provided which forms a step or rest for the animals. At the opposite end of the chamber 40 a platform 49 is provided which is at a higher elevation than the platform 47. An inclined board 50 at one side of the rear compartment leads from the platform 49 to the platform 47 and an inclined board 51 leads from the other side of the platform 47 down to the lower floor 53 with which the rear compartment is provided. Between the side boards 42 of the removable box member a chamber 55 is provided when the box member is in place, this chamber forming a secluded nook in which the rabbit or other animal confined within the hutch may bring forth her young.

In order to provide access to the compartment 8 for the purpose of inserting and removing the box structure which has the bottom 43, a removable roof 8x is provided for said compartment, said roof being provided along its under face and near the lower edge thereof with a cleat 8z which, when the roof is in place, engages the inner side of the upper edge of the back wall of the compartment 8, thus holding the roof 8x removably in position.

Describing certain details of construction, a roller 65 extends across the cover member 7b being supported near the lower said thereof by by trunnions 66. This roller is adapted to support the lower end of the cover or upper roof member 7a in such a manner that this roof member may readily be moved up and down to and from a position wherein it covers the compartment 7 of the hutch.

The side edges of the slidable roof member 7a are fitted within grooved guide arms 7f, each of said guide arms being provided with a heel portion 7h which is pivotally connected with a lug or bracket 7k carried by the wall 15. The front end of the roof member 7a is provided with a stop cleat 7a' which engages the ends of the arms 7f, to limit the sliding movement of said roof member. This construction prevents the complete removal of the upper roof member 7a but allows it to be adjusted in the steeply inclined position shown in dotted lines in Fig. 3 where it forms a shade for the rear compartment 8.

The door opening 16 through partition 15 is shown provided with a comb 16c located in the upper portion thereof which is adapted to comb the fur of animals passing therethrough.

I claim:

1. In a hutch, a compartment having an upright wall with a feed opening therethrough, a feed supporting platform secured to the outer side of said wall, a container having an open top and bottom, said container normally resting upon said platform to hold feed in place thereon, and a pivotal connection securing the upper inner corners of said container to said wall.

2. In a hutch, a compartment having an upright wall with a feed opening therethrough, a feed supporting platform secured to the outer side of said wall in a position to support feed opposite to said opening, feed bars extending across said opening, a container consisting of a strip of sheet metal having end portions which are pivotally connected with said wall, said container having a front portion which cooperates with said end portions to keep feed in place upon said platform.

3. In a hutch, a compartment having a cover member which consists of a frame having four side pieces, and an open mesh member secured to one side of said frame to support feed thereon in a position for access by animals within the hutch, and an upper cover member adapted to rest upon the first recited cover member and form a roof for the hutch.

4. In a hutch, a compartment having a roof portion which is movable to afford access to the compartment, a removable box portion, said box portion having side walls which extend below the floor thereof thus providing a chamber below the box between said side walls thereof.

5. In a hutch, a compartment having a roof portion which is movable to permit access to the compartment, and a box portion adapted for insertion within and removal from said compartment, said box portion being provided with a floor and with side walls which extend below said floor and are constructed and arranged to provide a chamber below said floor when the box is located within said compartment, there being at such time an opening between said side walls to permit animals to enter and leave said chamber.

6. In a hutch, a compartment having side walls, an open mesh frame member normally extending across the top of said compartment to support feed thereover in a position for access by animals within the hutch, and a cover member hingedly and slidably connected with said open mesh member and thus rendered movable to a position wherein said open mesh member is uncovered to permit ventilation therethrough.

7. In a hutch, a compartment having side walls, an open mesh frame member normally extending across the top of said compartment to support feed thereover in a position for access by animals within the hutch, a second compartment located along side said first recited compartment, and a cover member hingedly and slidably connected with said open mesh member and thereby rendered movable to a position wherein said open mesh member is uncovered to permit ventilation therethrough, said roof member at such time forming a sunshade for said second compartment.

In testimony whereof I hereunto affix my signature.

LUCIEN MERIAUX.